United States Patent [19]

Reinwall, Jr. et al.

[11] 3,917,202
[45] Nov. 4, 1975

[54] TERMINAL BLOCK MOUNTING BRACKET

[75] Inventors: Ernest William Reinwall, Jr., McHenry; Edmund J. Soltysik, Chicago; Richard Jay Lindeman, Elmwood Park, all of Ill.

[73] Assignee: Illinois Tool Works Inc., Chicago, Ill.

[22] Filed: June 24, 1974

[21] Appl. No.: 482,218

[52] U.S. Cl............... 248/68 R; 248/73; 248/223; 248/310; 174/72 A; 339/125 R
[51] Int. Cl.².................. F16L 3/22; H02B 1/02
[58] Field of Search.......... 248/49, 65, 67.7, 68, 71, 248/73, 216, 220.5, 223, 361 R, DIG. 3, 309, 310, 314, 316 R, 316 D; 174/138 D, 72 A; 317/122; 339/91 R, 119 R, 119 C, 125, 126, 128, 198 G, 198 GA; 179/98

[56] References Cited
UNITED STATES PATENTS

| | | | |
|---|---|---|---|
| 3,058,714 | 10/1962 | Oliver | 248/316 R X |
| 3,160,280 | 12/1964 | Burch | 339/198 GA |
| 3,391,383 | 7/1968 | Antes | 339/17 CF |
| 3,402,907 | 9/1968 | Fisher | 248/223 |
| 3,443,783 | 5/1969 | Fisher | 248/220.5 |
| 3,518,618 | 6/1970 | Swanson | 339/125 R |
| 3,777,223 | 12/1973 | Chandler | 174/72 A |
| 3,809,799 | 5/1974 | Taylor | 248/223 |

FOREIGN PATENTS OR APPLICATIONS

| | | | |
|---|---|---|---|
| 1,030,419 | 5/1958 | Germany | 339/198 GA |
| 4,311,067 | 6/1965 | Japan | 339/198 G |
| 1,206,354 | 8/1959 | France | 339/198 GA |
| 646,994 | 8/1962 | Canada | 248/316 D |

*Primary Examiner*—Roy D. Frazier
*Assistant Examiner*—Lawrence J. Staab
*Attorney, Agent, or Firm*—Olson, Trexler, Wolters, Bushnell & Fosse, Ltd.

[57] ABSTRACT

A one-piece bracket for mounting a telephone wire terminal block or the like at a stand-off position above a backboard is disclosed. The bracket includes an integral fastener for securing the bracket to the backboard with a simple one-eighth revolution twist. The bracket is also provided with upstanding pillars spaced apart in U-shaped configuration, and shoulders adjacent the pillars for supporting the block underside. This configuration provides an open throat between said pillars or arms to accept the laying in of cables or the like before mounting of the terminal block on said bracket. In one embodiment, these pillars and shoulders are configured to receive and retain any of a variety of differently shaped terminal blocks.

13 Claims, 16 Drawing Figures

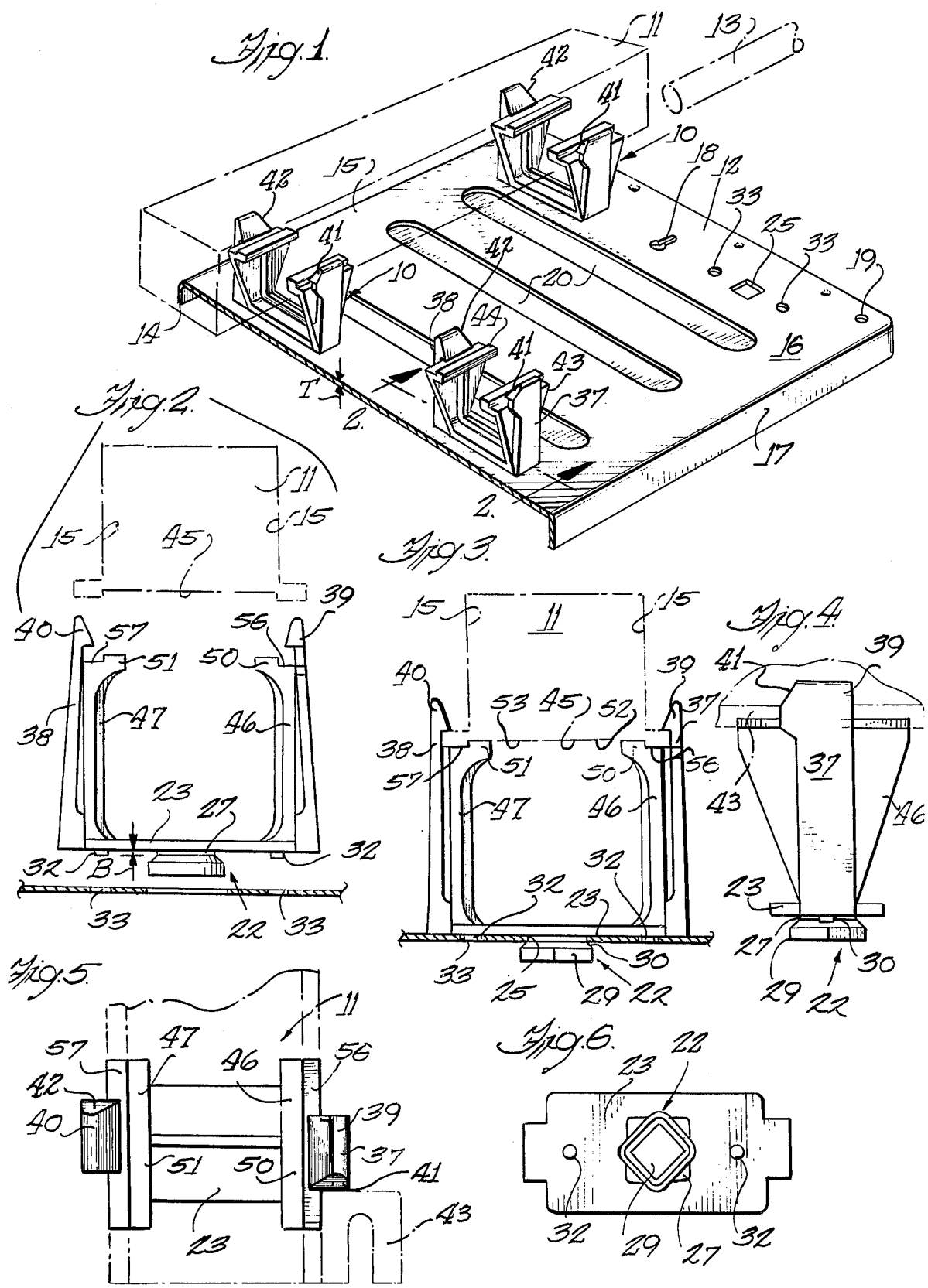

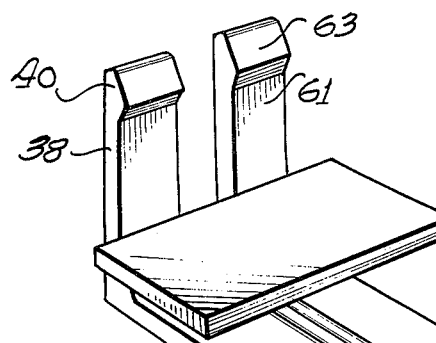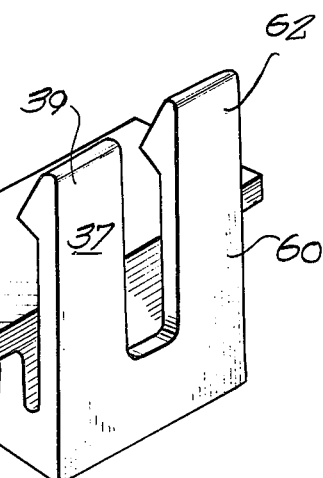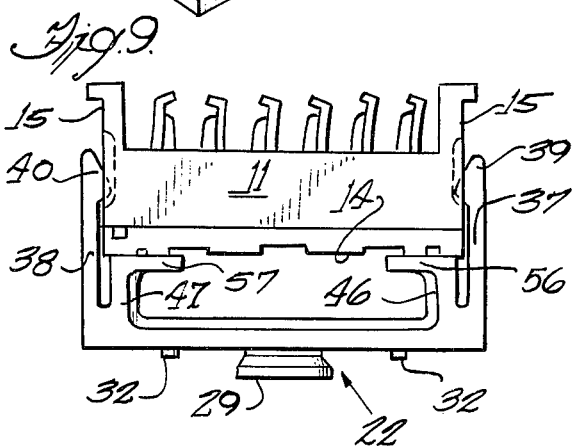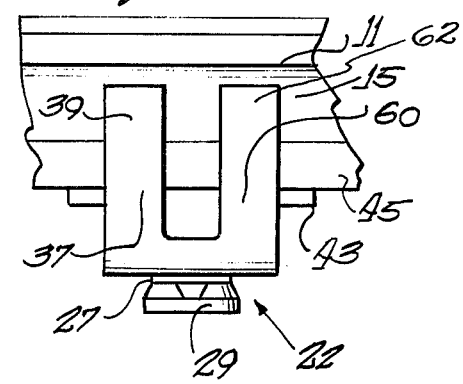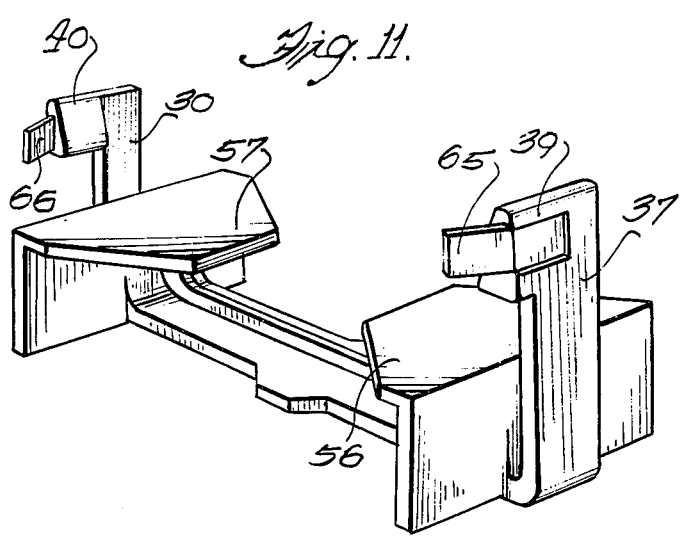

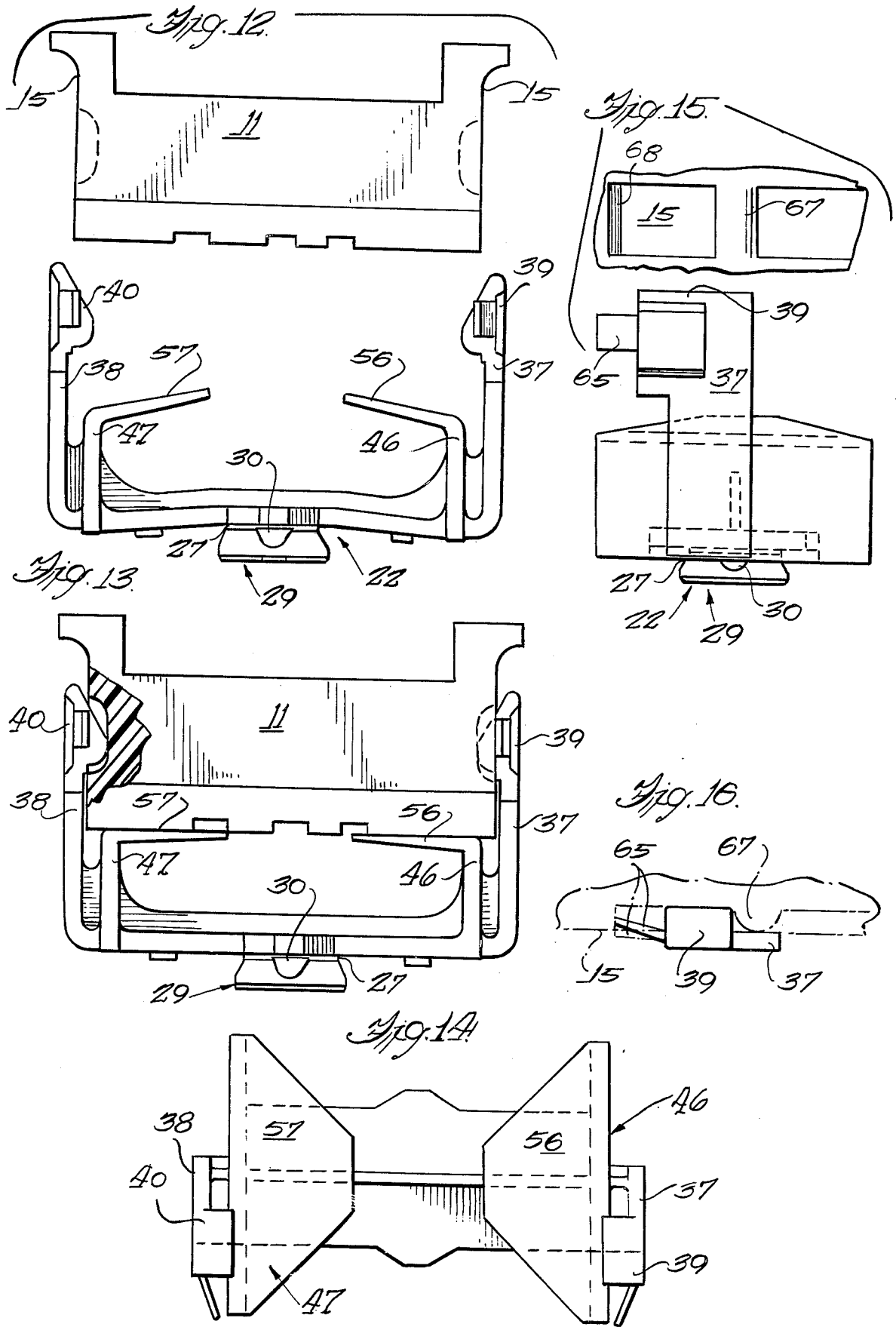

TERMINAL BLOCK MOUNTING BRACKET

BACKGROUND OF THE INVENTION

This invention relates to brackets for mounting telephone cable terminal connector blocks and the like at a stand-off position to a backboard or like foundation.

In modern commercial or industrial key telephone systems and like electrical wiring installations, individual terminal interconnecting points are necessary. At these interconnecting points, a number of wires leading, in cable form, from a telephone central office or other source can be connected to wires leading from a number of individual telephone sets or other equipment. Often, several hundred or more individual wire interconnections must be made, and it is advantageous to make such connections in a compact yet logical way.

To provide a mechanical structure for such wire interconnections, modern practice calls for a terminal connector block; this block is provided with a great number of connector terminals to which the wires can be conveniently attached.

Since a number of cables lead to and from this terminal connector block, and since a great number of wires are to be routed to the individual block connectors, it is of advantage to secure the block to a firm foundation such as a backboard. Further, economy of space and logic in wire routing can be obtained and improved by mounting the block at a position spaced above the backboard or other foundation at a stand-off distance.

At present, mounting the terminal block at its stand-off distance above the foundation can be accomplished by using a closed bracket device. This device is secured as by screws to the foundation, and the terminal connecting block itself is then fastened atop it. Apertures are formed in the ends and sides of such brackets to permit the necessary cables and wires to be routed under, through, and around the bracket to the terminal connector block. These one-piece brackets are relatively expensive, and wire routing can require convoluted turns and cumbersome pathways due to disadvantageous bracket aperture locations.

Other methods and structure are known for mounting the terminal connector blocks either directly to or at a stand-off distance above the backboard. Many of these devices are expensive, some provide only infirm or shaky block support, and most do not easily permit the desired wire routing. Moreover, terminal block mounting and dismounting may be cumbersome and time-consuming, especially if attempted by relatively inexperienced personnel in on-site field conditions.

It is accordingly the general object of the present invention to provide a one-piece, economical fastener bracket to support the terminal block at a stand-off distance from a mounting or foundation backboard.

Another object of the invention is to provide a fastener bracket which can be attached to a terminal backboard without using separate fastener parts, and without requiring access to the reverse side of the mounting backboard or other foundation. A related object is to provide a one-piece fastener bracket which can be quickly and easily unpacked, installed and used at the installation site by field personnel. Another related object is to provide such a fastener bracket which can be easily removed from the foundation backboard and from the terminal block when terminal interconnection point mounting structure parts are inadvertently damaged, or when wire rerouting and terminal interconnecting point mounting structure rearrangement is required.

Yet another object of the invention is to provide a one-piece fastener bracket for use with a variety of terminal backboards and blocks, thereby reducing part inventory and attendant costs.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a general perspective view showing one embodiment of the novel mounting bracket as it appears when installed upon a foundation backboard and supporting a typical terminal connecting block;

FIG. 2 is an exploded front elevational view taken substantially in the plane of line 2—2 in FIG. 1 showing the backboard, the novel mounting bracket and a terminal connecting block in disassembled positions;

FIG. 3 is a front elevational view similar to FIG. 2 and taken substantially in the plane of line 2—2 in FIG. 1 but showing the bracket mounted upon the backboard and carrying and retaining the terminal block;

FIG. 4 is a side elevational view of the novel mounting bracket;

FIG. 5 is a top plan view showing in further detail the novel mounting bracket;

FIG. 6 is a bottom plan view showing the underside of the novel terminal mounting bracket;

FIG. 7 is a perspective view showing a first alternate embodiment of the terminal mounting bracket;

FIG. 8 is an exploded front elevational view similar to FIG. 2 showing the alternate bracket and a companion terminal mounting block of alternate design;

FIG. 9 is a front elevational view similar to FIG. 3 and showing the mounting bracket and connecting block in interconnected relationship;

FIG. 10 is a side elevational view similar to FIG. 4 and showing the alternate mounting bracket connected to the terminal connecting block;

FIG. 11 is a perspective view similar to FIG. 7 and showing a second alternate embodiment of the terminal mounting bracket;

FIG. 12 is an exploded front elevational view similar to FIGS. 2 and 8 and showing the mounting bracket as it appears before connection to a terminal connector block;

FIG. 13 is a front elevational view similar to FIGS. 3 and 9 and showing the mounting bracket and terminal block in interconnected relationship;

FIG. 14 is a top plan view similar to FIG. 5 showing in further detail the second alternate embodiment of the mounting bracket;

FIG. 15 is a side elevational view somewhat similar to FIGS. 4 and 10 but showing in exploded relationship the mounting bracket and a portion of the terminal connector block; and FIG. 16 is a fragmentary top plan view showing in further detail the interrelationship between the mounting bracket and terminal connector block.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Turning first to FIG. 1, there is shown one embodiment of the novel bracket 10 as it is used to support a terminal connecting block or terminal block 11 (shown in phantom lines) at a stand-off position above a backboard 12 or other mounting foundation. As can be envisioned, when the terminal block is so mounted, cables 13 can be easily passed below an underside 14 and around block sides 15 to permit individual wires constituting the cable to be easily connected to individual terminal block connectors (not shown). In the illustrated embodiment, the backboard 12 includes a pan member 16 which is spaced above a wall (not shown) or other surface by a skirt 17. The pan is also provided with screw-accepting mounting holes 18 and 19 for attaching the backboard to the foundation wall. Stiffening ribs 20 are formed on or in the pan 16 to provide a rigid and secure pan foundation for the mounting brackets 10.

In accordance with one aspect of the invention, this novel bracket 10 is formed as a single piece, and includes an integral fastener 22 depending from a bracket base 23, as shown in FIGS. 2–4, 6 and elsewhere. The fastener 22 permits the bracket 10 to be attached to the backboard 12 by field personnel without using additional parts, and without requiring access to the reverse side of the backboard. Furthermore, this fastener 22 firmly secures the bracket 10 on the backboard 12 in a predefined angular relationship to a backboard polygonal hole 25. To this end, the fastener 22 includes a collar 27 which is of a thickness B not greater than the backboard thickness T and which is of a polygonal cross-sectional shape substantially coextensive with the polygonal backboard mounting hole 25. Thus, when the fastener collar 27 is secured in the backboard hole 25, the base 27 substantially fills the hole 25, and angular rotation of the bracket 10 upon the backboard 12 is discouraged.

To secure the fastener collar 27 in the hole 25, the fastener 22 is provided with a base-depending head 29 of polygonal cross-sectional shape which is congruent with, but which need not necessarily be as coextensively large as the mounting hole 25. However, as most easily seen in FIG. 6, the head 29 is angularly offset with respect to the collar 27. In the illustrated embodiment, the hole 25, the collar 27 and the head 29 are all substantially square in shape, and the head 29 is angularly offset with respect to the collar 27 at an angle of substantially 45°. Thus, the bracket can be easily locked in place by pushing the fastener head 29 into and through the backboard hole 25, and then rotating the bracket through substantially one-eighth of a full revolution. This rotation causes cam surfaces 30 extending between the head 29 and collar 27 to cam the base 27 into the hole 25 and into its locking position.

Fastener arrangements of this general type are disclosed in U.S. Pat. Nos. 3,443,783 to Fisher, in U.S. Pat. 2,940,558 to Schlueter, and are also disclosed in copending U.S. application Ser. No. 333,574 by Fisher, filed Feb. 20, 1973.

It is a feature of the invention that secondary fasteners are provided to further secure the bracket on the backboard against rotation. To this end, the bracket base 23 is provided with secondary studs 32 projecting in a direction generally parallel to the primary fastener 22. Mating recesses — here, holes 33 — are formed in the backboard 12; when the studs 32 mate with the holes 33, further angular rotation of the bracket 10 upon the backboard 12 is inhibited.

In accordance with another aspect of the invention, support means project from the base to engage and retain the terminal block 11 at its stand-off position above the bracket base 23 and mounting backboard 12. In each of the illustrated bracket embodiments, this support means includes two opposed upstanding arms 37 and 38 located at opposite sides of the base 23. These arms 37 and 38 terminate in respective embossed free ends 39 and 40 which are adapted to engage the ribbed sides 15 of the terminal block 11, or extending side tabs (not shown).

It is a feature of the invention that each arm free end 39 and 40 is provided with an inclined cam surface 41 and 42 respectively, oriented to engage a shelf 43 carried near an underside 45 of the terminal block. Interengagement between the bracket cam surface 41 and 42 and the adjacent block shelf 43 at each end of the terminal block longitudinally tensions the block, and forces each bracket 10 and the arm free end 39 and 40 toward the other bracket in a direction parallel to the length of the terminal block, as can be envisioned from FIG. 1. This block tensioning and bracket engagement prevents block motion in a direction parallel to the block length, and helps secure the block 11 above the backboard 12 on the brackets 10. Located adjacent arms 37 and 38 are shelves 56 and 57 respectively which are formed to directly engage and support the underside 45 of the terminal block 11 over an extended distance at the desired stand-off position above the backboard 12.

These shelves 56 and 57 can take different shapes, depending upon the overall shape of the terminal block 11 and its underside 14. In the first bracket embodiment illustrated in FIGS. 1–5, embossments 50 and 51 are provided to engage correspondingly recessed portions 52 and 53 on the terminal block underside 14. Shelves 56 and 57 are provided in all three embodiments to act as block underside support flooring. In the bracket embodiment illustrated in FIG. 12, the shelves 56 and 57 are formed in a normally canted or upwardly slanted position. When the block 11 is thereafter installed over the shelves 56 and 57 as illustrated in FIG. 13, the shelves are resiliently urged into a substantially horizontal position. The resilient upwardly directed biasing force applied against the block bottom 14 by the slightly strained shelves 56 and 57 urges the block 11 upwardly and into more firm engagement with the embossed retaining finger free ends 39 and 40. Thus, a block 11 of any of a limited range of thicknesses or side heights and configurations can be accommodated and firmly retained on the bracket. In this way, different terminal blocks offered by different manufacturers can be accommodated on a single embodiment of the bracket.

In accordance with the invention, when the block underside 14 is engaged by shelf embossments 50 and 51 of extended lateral dimension, as in the bracket embodiment illustrated in FIGS. 2–5, angular rotation between the bracket 10 and block 11 is discouraged. Thus, secure interconnection between the backboard 12, the support brackets 10 and the block 11 is assured. To this end, the enlarged or embossed bracket pillar free ends 39 and 40 can be of extended width to engage the terminal block sides 15 over a corresponding extended distance and discourage relative angular or other rotation between the block and bracket while retaining the terminal block 11 on the bracket shoulders 46 and 47.

In the embodiment illustrated in FIGS. 7–10, secondary arms 60 and 61 are formed with shapes similar to the primary arms 37 and 38. Like the primary arms 37 and 38, the secondary arms 60 and 61 are provided with embossed free ends 62 and 63 adapted to engage the ribbed sides 15 of the terminal block 11. As illustrated particularly in FIG. 10, however, the secondary arm-block side engagement occurs at locations spaced apart from the primary arm-side engagement positions. This arrangement discourages block-bracket relative rotation or disengagement.

In the bracket embodiment illustrated in FIGS. 11–16, tabs 65 and 66 can be included to project horizontally from the sides of the free ends 39 and 40 to engage the sides 15 of the terminal block 11. Some terminal blocks to be accommodated on and mounted by the bracket are provided with a rib 67, while others are not. In ribbed blocks, the bracket embossed free end 39 is firmly retained between the block side rib 67 and the bracket tab 65, which compressively engages a block side slot end wall 68. If the block 11 is not configured to engage the bracket tab 65 at an end wall, the tab 65 simply rests on the block side 15, as can be envisioned from FIG. 16.

The invention is claimed as follows:

1. A bracket for retaining a rectilinear terminal block or the like at an apertured stand-off position above a backboard or a like mount, comprising a base, a fastener for securing the bracket base to the backboard in a predetermined location and in a predetermined angular orientation, at least two opposed upstanding primary arms at opposite base sides and shoulder means located adjacent the free end of each primary arm and adapted to engage and support the terminal block underside over an extended distance at the stand-off position above the base, at least two opposed secondary arms extending upwardly from opposite sides of the base adjacent said primary arms and having an extent substantially greater than said primary shoulder carrying arms, each of said secondary arms including retainer means for engaging the terminal block and locking the block and bracket together in predetermined angular relationship, said shoulder means including a cantilever-like flange extending inwardly in opposed relation from each primary arm toward the other primary arm and terminating in spaced relation to provide an open throat between said primary arms to accept the laying in of cables or the like before mounting of a terminal block on said bracket.

2. A bracket according to claim 1 wherein said base is at least partially defined by a bottom plane adapted to abut said backboard, and including at least one secondary securing stud projecting from said bottom plane in a direction parallel to but spaced apart from said fastener, said secondary stud adapted to mate with a recess in the backboard to secure the bracket against angular rotation when mounted upon the backboard.

3. A bracket according to claim 1 wherein said fastener is angularly offset with respect to said base at an angle of substantially 45°, the bracket being lockable to said backboard when the fastener is pushed into and through a backboard aperture and the bracket is rotated through substantially one-eighth revolution to resiliently cam said fastener into said backboard aperture.

4. A bracket according to claim 1 wherein said fastener includes a base and a head which are rectilinear in shape, and said backboard aperture is complementary thereto.

5. A bracket according to claim 4 wherein said fastener includes a base and a head which are substantially square in shape, and said backboard aperture is complementary thereto.

6. A bracket according to claim 1 wherein at least one of said arms is provided with an inclined cam oriented to engage the terminal block for longitudinally tensioning the block and forcing the bracket and arm free end toward another bracket in a direction parallel to the length of the terminal block.

7. A bracket according to claim 1 wherein said shoulder means includes embossments to engage the underside of said terminal block.

8. A bracket according to claim 1 wherein said retainer means is configured to engage and lock any of a variety of differently configured terminal blocks.

9. A bracket according to claim 1 wherein said retainer means includes at least one tab located at the side of each secondary arm to engage a corresponding side of said terminal block.

10. A bracket according to claim 1 including at least two additional arms extending from said base to engage the sides of said terminal block at locations spaced apart from the locations at which the secondary arms engage said terminal block.

11. A bracket according to claim 1 wherein said secondary arms are provided with free end retainer means of extended width adapted to engage said terminal block sides over a corresponding extended distance.

12. A bracket according to claim 1 wherein said secondary arms are provided with fingers at the free ends of the arms to engage the terminal block sides and retain the terminal block on said shoulder means.

13. A bracket according to claim 1 wherein said flanges are divergent relative to said base and are resiliently biasable to insure positive engagement between said retainer means and the terminal block.

* * * * *